(12) United States Patent
Ogura

(10) Patent No.: US 11,959,538 B2
(45) Date of Patent: Apr. 16, 2024

(54) GEAR MANUFACTURING METHOD AND GEAR

(71) Applicant: KYB Corporation, Tokyo (JP)

(72) Inventor: Shogo Ogura, Gifu (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 17/758,680

(22) PCT Filed: Dec. 16, 2020

(86) PCT No.: PCT/JP2020/046907
§ 371 (c)(1),
(2) Date: Jul. 12, 2022

(87) PCT Pub. No.: WO2021/145125
PCT Pub. Date: Jul. 22, 2021

(65) Prior Publication Data
US 2023/0058996 A1    Feb. 23, 2023

(30) Foreign Application Priority Data

Jan. 15, 2020 (JP) .................. 2020-004286

(51) Int. Cl.
*F16H 55/06* (2006.01)
*B29D 15/00* (2006.01)
*F16H 55/22* (2006.01)

(52) U.S. Cl.
CPC ............. *F16H 55/06* (2013.01); *B29D 15/00* (2013.01); *F16H 55/22* (2013.01); *F16H 2055/065* (2013.01)

(58) Field of Classification Search
CPC .... F16H 55/22; F16H 55/06; F16H 2055/065; B29D 15/00
USPC ......................................... 425/555
See application file for complete search history.

(56) References Cited

U.S. PATENT DOCUMENTS

| 2002/0051860 A1* | 5/2002 | Hiroi ................. B29C 45/572 |
|---|---|---|
| | | 264/328.7 |
| 2007/0087617 A1* | 4/2007 | Oberle ................... F16H 55/06 |
| | | 439/395 |

FOREIGN PATENT DOCUMENTS

| JP | H06294459 A | 10/1994 |
|---|---|---|
| JP | H11294543 A | 10/1999 |
| JP | 2018-017302 A | 2/2018 |

* cited by examiner

*Primary Examiner* — Terence Boes
(74) *Attorney, Agent, or Firm* — Rabin & Berdo, P.C.

(57) ABSTRACT

A gear manufacturing method, the gear including an annular gear portion including teeth on an outer periphery, an annular support portion provided on an inner peripheral surface of the gear portion and supporting the gear portion, and a core portion provided inside the support portion, the method includes: a support portion molding step of molding the support portion by disposing the gear portion and the core portion in an annular mold and filling a resin between the gear portion and the core portion; and a support portion cooling step of cooling the support portion molded in the support portion molding step, a radial gap between the teeth of the gear portion and the mold before the support portion molding step is set to be smaller than a radial shrinkage amount of the support portion in the support portion cooling step.

3 Claims, 9 Drawing Sheets

GEAR MANUFACTURING METHOD AND GEAR

TECHNICAL FIELD

The present invention relates to a gear manufacturing method and a gear.

BACKGROUND ART

A gear is known as a means for transmitting a rotational force of a drive shaft to a driven shaft. A gear disclosed in JP 2018-17302 A includes an annular gear portion including teeth on an outer periphery, an annular resin support portion provided on an inner peripheral surface of the gear portion and supporting the gear portion, and a metal core portion provided inside the support portion. The support portion of the gear is molded by disposing the core portion in a mold and filling a molten resin between the gear portion, which is a primary molded product, and the core portion.

SUMMARY OF INVENTION

The gear portion of the gear disclosed in JP 2018-17302 A is made of resin. Therefore, when the support portion is molded by filling the molten resin between the gear portion and the core portion, the gear portion expands due to heat and pressure of the molten resin, and thereafter, when the support portion is cooled, the gear portion shrinks with heat shrinkage of the molten resin. Accordingly, an outer diameter of the gear portion changes between before molding and after cooling of the support portion, and a residual stress is generated in the gear portion. The residual stress may affect durability of the gear portion.

An object of the present invention is to provide a gear manufacturing method and a gear that reduce an influence on durability of a gear portion of a gear.

According to one aspect of the present invention, a gear manufacturing method, the gear including an annular gear portion having teeth on an outer periphery, an annular support portion provided on an inner peripheral surface of the gear portion and supporting the gear portion, and a core portion provided inside the support portion, the method includes: a support portion molding step of molding the support portion by disposing the gear portion and the core portion in an annular mold and filling a resin between the gear portion and the core portion; and a support portion cooling step of cooling the support portion molded in the support portion molding step, a radial gap between the teeth of the gear portion and the mold before the support portion molding step is set to be smaller than a radial shrinkage amount of the support portion in the support portion cooling step.

According to another aspect of the present invention, a gear, includes: an annular gear portion having teeth on an outer periphery; an annular support portion provided on an inner peripheral surface of the gear portion and supporting the gear portion; and a core portion provided inside the support portion, a radial gap between the teeth of the gear portion and an annular mold before a support portion molding step of molding the support portion by disposing the gear portion and the core portion in the mold and filling a resin between the gear portion and the core portion is set to be smaller than a radial shrinkage amount of the support portion in a support portion cooling step of cooling the support portion molded in the support portion molding step.

DESCRIPTION OF EMBODIMENTS

Hereinafter, a gear 100 according to an embodiment of the present invention will be described with reference to the drawings.

Figure 1:
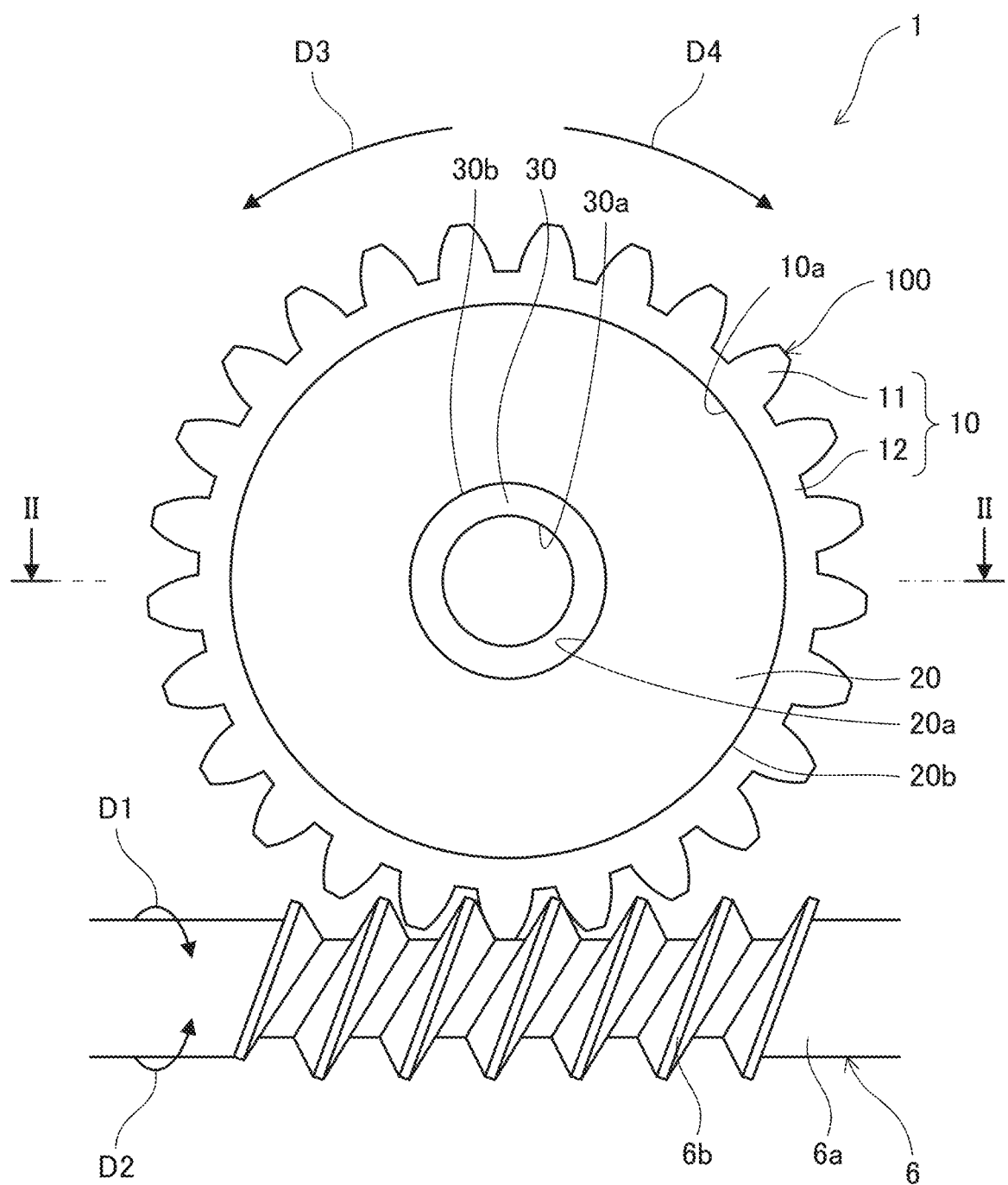
FIG. 1 is a front view of a gear according to an embodiment of the present invention in a state of meshing with a worm shaft.

As shown in FIG. 1, the gear 100 is used in a worm reducer 1. The gear 100 is, for example, a worm wheel.

In the worm reducer 1, the gear 100 meshes with a worm shaft 6. The worm shaft 6 is connected to a rotary shaft (not shown) of a motor, and the gear 100 is connected to, for example, a pinion (not shown).

When the worm shaft 6 rotates with rotation of the motor, the gear 100 rotates. At this time, the rotation of the worm shaft 6 is decelerated and transmitted to the gear 100. The pinion rotates with the rotation of the gear 100. In this way, the worm reducer 1 decelerates the rotation of the motor via the worm shaft 6 and the gear 100, and transmits the decelerated rotation to the pinion.

Hereinafter, a direction along a rotation axis of the gear 100 is referred to as an "axial direction", a radiation direction around the rotation axis of the gear 100 is referred to as a "radial direction", and a direction along the circumference of the rotation axis of the gear 100 is referred to as a "peripheral direction".

The worm shaft 6 includes a columnar shaft main body 6a and shaft teeth 6b spirally formed on an outer periphery of the shaft main body 6a. The worm shaft 6 is formed of an iron alloy, and the shaft main body 6a and the shaft teeth 6b are integrally formed.

A plurality of wheel teeth 11 that mesh with the shaft teeth 6b are formed on an outer periphery of the gear 100.

When the worm shaft 6 rotates in a direction D1 shown in FIG. 1, the wheel teeth 11 are pushed by the shaft teeth 6b. Accordingly, the gear 100 rotates in a direction D3 shown in FIG. 1. When the worm shaft 6 rotates in a direction D2 shown in FIG. 1, the wheel teeth 11 are pressed by the shaft teeth 6b in a direction opposite to the above case. Accordingly, the gear 100 rotates in a direction D4 shown in FIG. 1.

Figure 2:
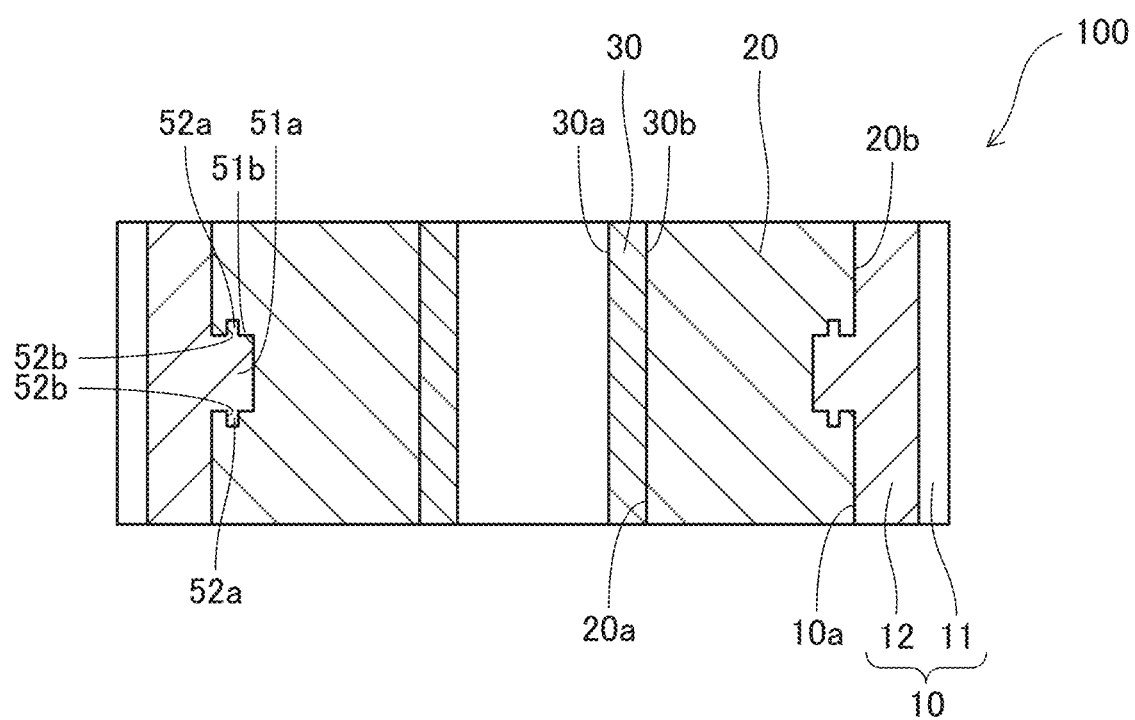
FIG. 2 is a cross-sectional view taken along a line II-II in FIG. 1.

FIG. 2 is a cross-sectional view taken along a line II-II in FIG. 1. As shown in FIGS. 1 and 2, the gear 100 includes an annular gear portion 10 having wheel teeth 11 on an outer periphery. The gear portion 10 includes an annular wheel main body 12, and the wheel teeth 11 protrude radially outward from an outer periphery of the wheel main body 12. The wheel teeth 11 and the wheel main body 12 are made of, for example, resin, and are integrally formed by molding. Examples of the resin used for the gear portion 10 include, but are not limited to, polyamide 6, polyamide 66, polyamide 46, polyacetal, polyether ether ketone (PEEK), and polyphenylene sulfide (PPS).

An annular support portion 20 that supports the gear portion 10 is provided on an inner peripheral surface 10a of the gear portion 10. The support portion 20 is formed of a fiber reinforced resin. The fiber reinforced resin is, for example, a resin obtained by blending a fiber reinforcing material such as glass fiber or carbon fiber with a base resin such as polyamide 6, polyamide 66, polyamide 46, polyacetal, PEEK, and PPS.

The fiber reinforcing material is not blended in the resin used for the gear portion 10. The resin used for the gear portion 10 is softer than the fiber reinforced resin, and an elastic modulus of the gear portion 10 is lower than an elastic modulus of the support portion 20. Therefore, when the shaft teeth 6b mesh with the wheel teeth 11, the shaft teeth 6b are less likely to be worn, and durability of the worm reducer 1 can be improved.

Inside the support portion 20, a core portion 30 is provided in close contact with the support portion 20. The core portion 30 is made of metal. The core portion 30 is formed in an annular shape, and a shaft (not shown) of the pinion is fitted to an inner peripheral surface 30a of the core portion 30.

Figure 3A:
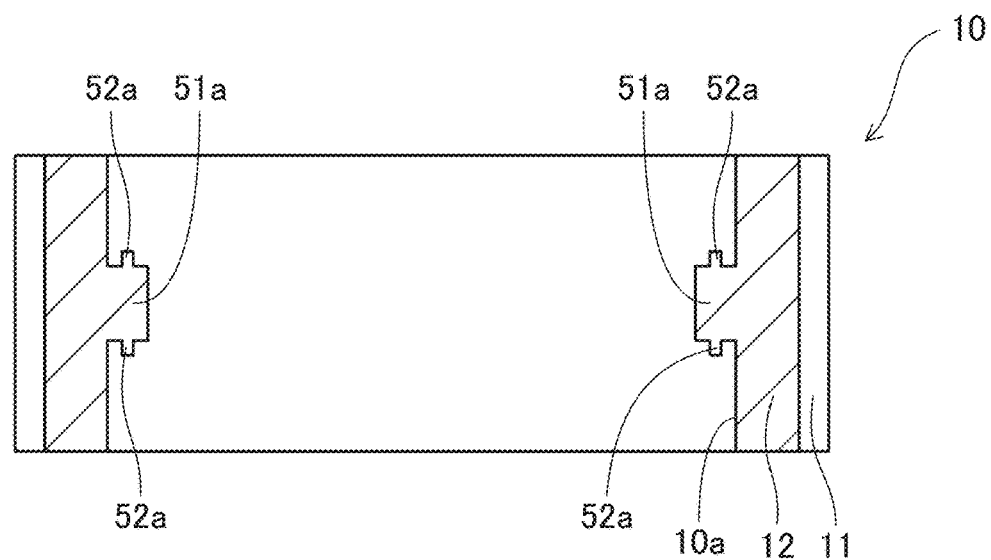
FIG. 3A is a cross-sectional view of a gear portion corresponding to FIG. 2.
Figure 3B:
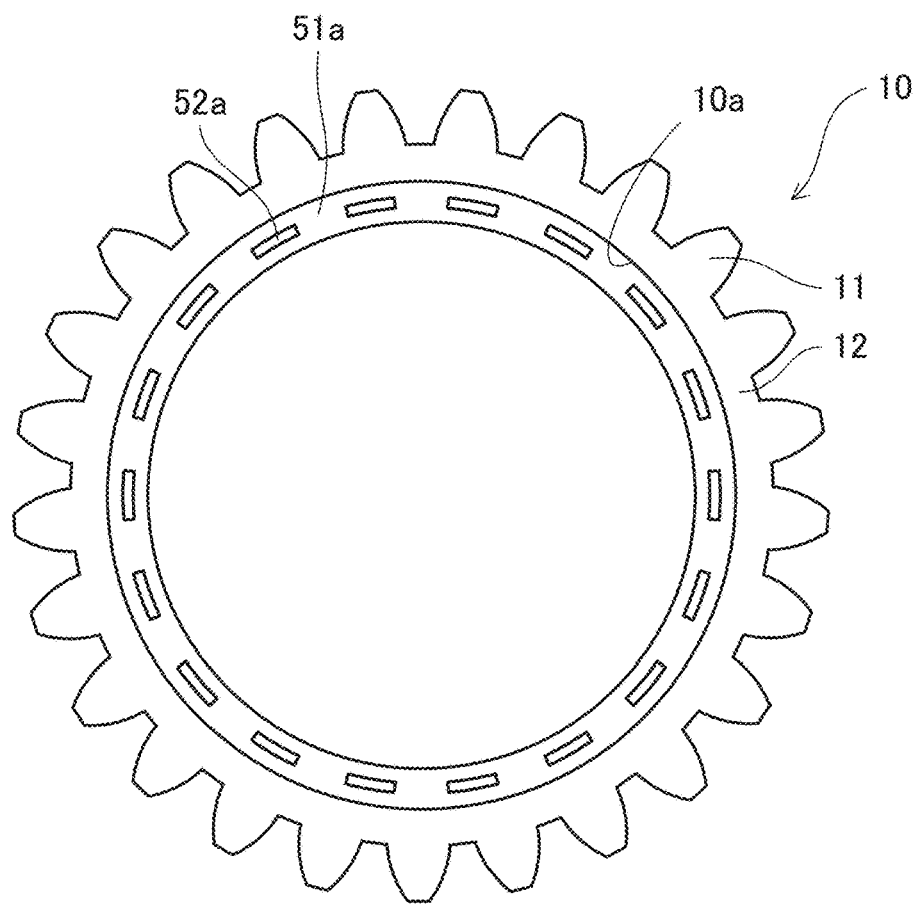
FIG. 3B is a front view of the gear portion.

FIG. 3A is a cross-sectional view of the gear portion 10. FIG. 3B is a front view of the gear portion 10. As shown in FIGS. 3A and 3B, in the gear portion 10, an annular protrusion 51a protruding radially inward is formed on an inner peripheral surface 10a, and a plurality of rod-shaped protrusions 52a protruding in the axial direction are formed on both axial end surfaces of the annular protrusion 51a.

Figure 4A:
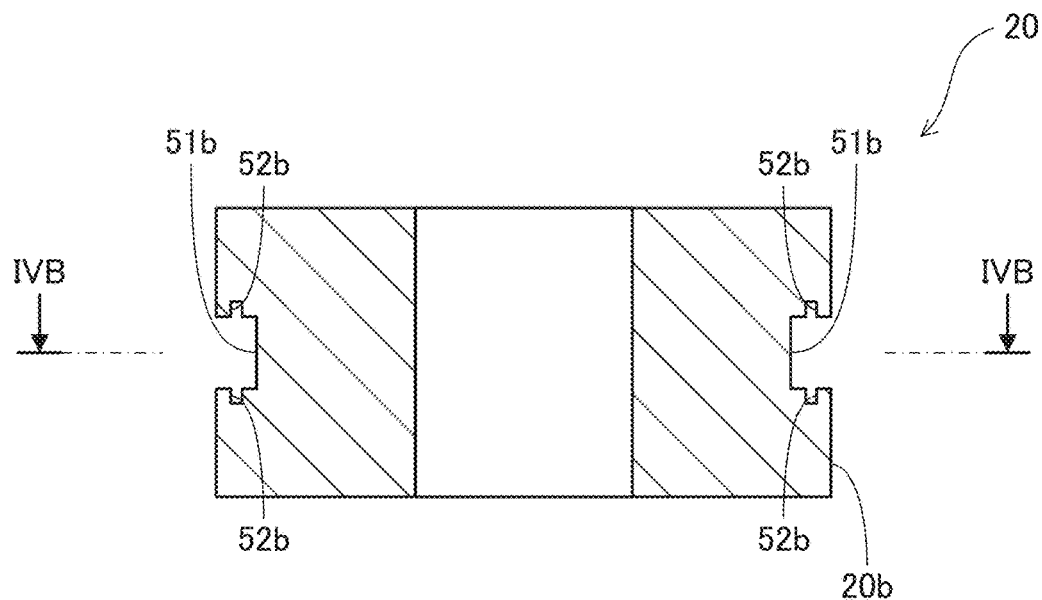
FIG. 4A is a cross-sectional view of a support portion corresponding to FIG. 2.
Figure 4B:
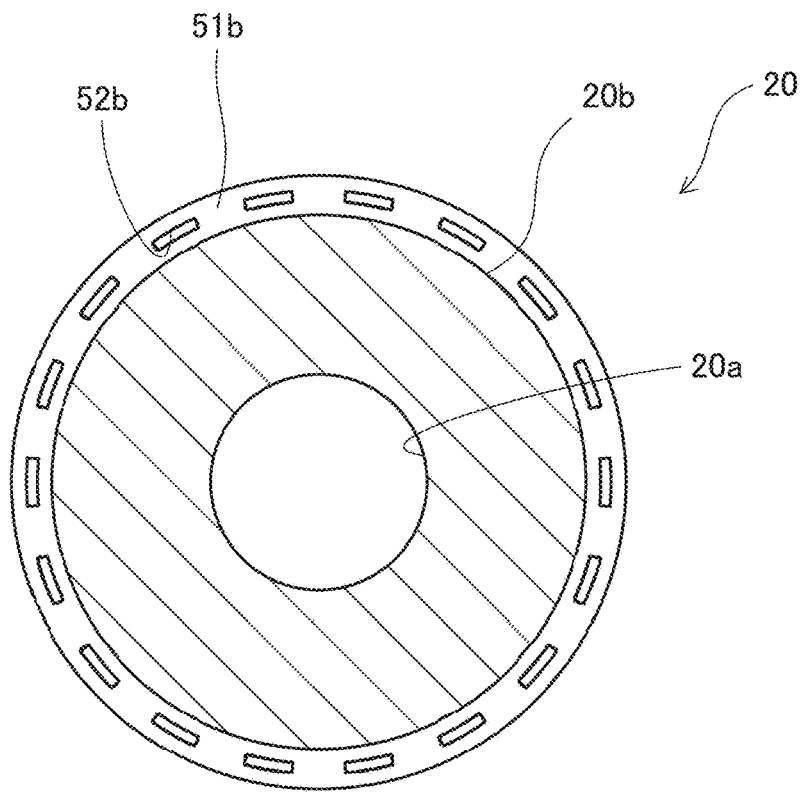
FIG. 4B is a cross-sectional view taken along a line IVB-IVB in FIG. 4A.

FIG. 4A is a cross-sectional view of the support portion 20. FIG. 4B is a cross-sectional view taken along a line IVB-IVB in FIG. 4A. As shown in FIGS. 4A and 4B, an annular groove 51b extending in the peripheral direction is formed on an outer peripheral surface 20b of the support portion 20, and a plurality of holes 52b extending in the axial direction are formed on both axial end surfaces of the annular groove 51b.

As shown in FIG. 2, the annular protrusion 51a of the gear portion 10 is disposed in the annular groove 51b of the support portion 20. The gear portion 10 and the support portion 20 are restricted from moving relative to each other in the axial direction by the annular protrusion 51a and the annular groove 51b being in contact with each other in the axial direction. Therefore, the separation between the gear portion 10 and the support portion 20 can be prevented.

The rod-shaped protrusions 52a of the gear portion 10 are arranged in the holes 52b of the support portion 20, respectively. The gear portion 10 and the support portion 20 are restricted from rotating relative to each other in the peripheral direction by the rod-shaped protrusions 52a and the holes 52b being in contact with each other in the peripheral direction. Therefore, a rotational force can be reliably transmitted between the gear portion 10 and the support portion 20.

In the gear 100, the annular protrusion 51a is formed over the entire periphery of the gear portion 10, and the annular groove 51b is formed over the entire periphery of the support portion 20. Alternatively, the annular protrusion 51a may be formed in a part in the peripheral direction. In this case, the annular groove 51b may be formed in a part in the peripheral direction corresponding to the annular protrusion 51a.

The annular protrusion 51a may be formed on the outer peripheral surface 20b of the support portion 20 instead of the inner peripheral surface 10a of the gear portion 10. In this case, the annular groove 51b is formed on the inner peripheral surface 10a of the gear portion 10 instead of the outer peripheral surface 20b of the support portion 20.

The rod-shaped protrusions 52a may be formed on side surfaces of the annular groove 51b instead of the annular protrusion 51a. In this case, the holes 52b are formed on the end surfaces of the annular protrusion 51a instead of the side surfaces of the annular groove 51b.

Next, a method for manufacturing the gear 100, particularly a manufacturing step for the support portion 20, will be described with reference to FIGS. 5 to 8. In FIGS. 5 to 8, a radial length of a gap 80 to be described later, and expansion and a shrinkage amount of the gear portion 10 are shown at an exaggerated size.

The support portion 20 is manufactured by a support portion molding step of filling an annular mold 60 with a molten material, and a support portion cooling step of cooling the molded support portion 20. Before the support portion 20 is manufactured, a radial shrinkage amount B (see FIGS. 7A and 7B) of the support portion 20 in the support portion cooling step is specified. Specifically, the radial shrinkage amount B of the support portion 20 is specified in advance based on a composition of the molten material, a filling temperature, a filling pressure, a filling amount, and the like.

<Support Portion Molding Step>

Figure 5A:
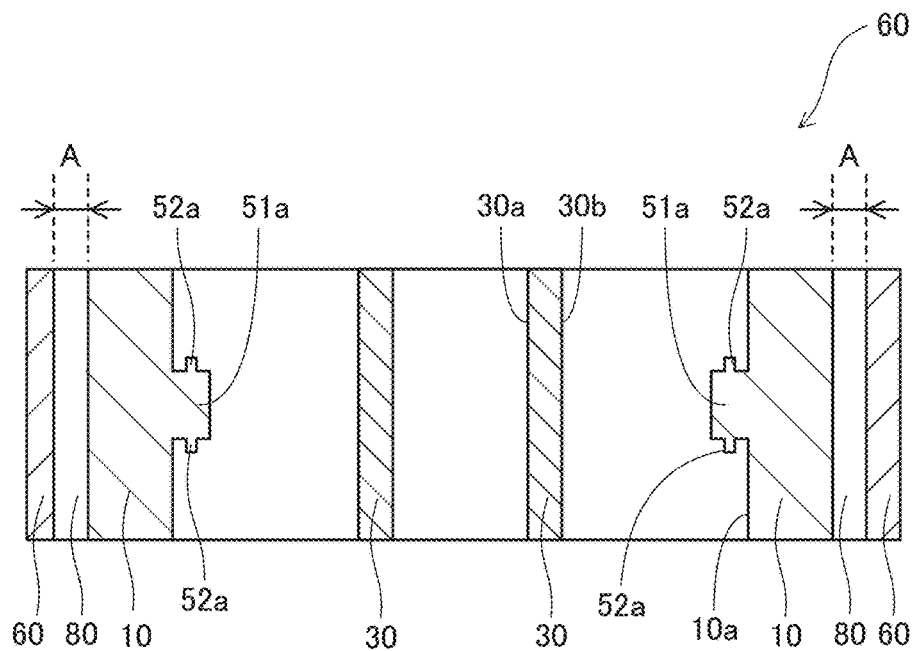
FIG. 5A is a cross-sectional view of the gear before a support portion molding step.
Figure 5B:
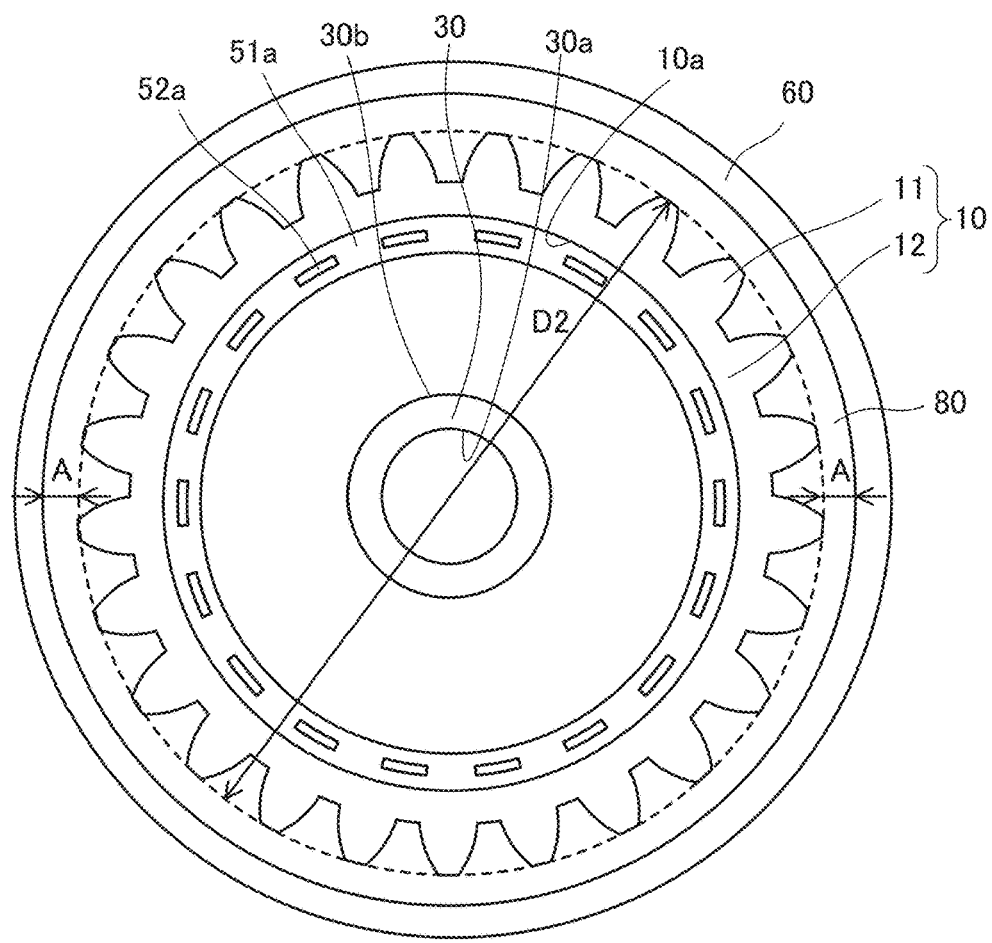
FIG. 5B is a front view of the gear before the support portion molding step.

First, as shown in FIGS. 5A and 5B, the gear portion 10, which is a primary molded product molded in advance, is disposed in the mold 60, and the core portion 30 is disposed in the gear portion 10. When the gear portion 10 is disposed in the mold 60, the gap 80 is formed between an inner peripheral surface of the mold 60 and top portions of the wheel teeth 11 of the gear portion 10.

Here, an inner diameter of the mold 60 is set based on the radial shrinkage amount B of the support portion 20 in the support portion cooling step specified in advance and a design value of an outer diameter of the gear portion 10. Specifically, the inner diameter of the mold 60 is set to be a sum of a design value D1 (see FIG. 7B) of the outer diameter of the gear portion 10 and a value obtained by doubling the radial shrinkage amount B of the support portion 20. An outer diameter D2 of the gear portion 10 before the support portion molding step is set based on the inner diameter of the mold 60 and the radial shrinkage amount B of the support portion 20 in the support portion cooling step specified in advance. Specifically, the outer diameter D2 of the gear portion 10 is set such that a radial length A of the gap 80 is smaller than the radial shrinkage amount B of the support portion 20. By setting the inner diameter of the mold 60 and the outer diameter D2 of the gear portion 10 in this way, the radial length A of the gap 80 is set to be smaller than the radial shrinkage amount B of the support portion 20 specified in advance.

Figure 6A:
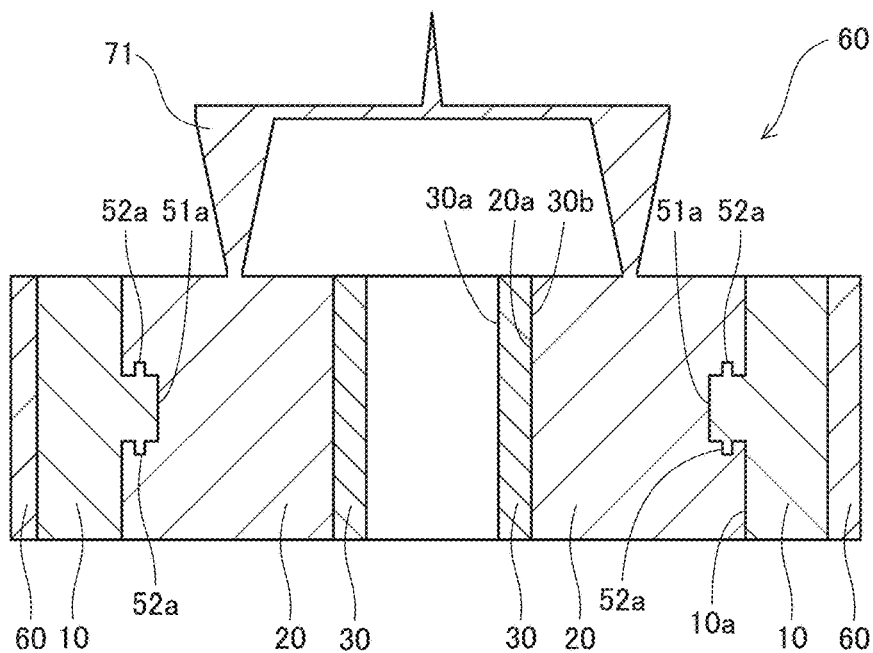
FIG. 6A is a cross-sectional view of the gear after the support portion molding step.
Figure 6B:
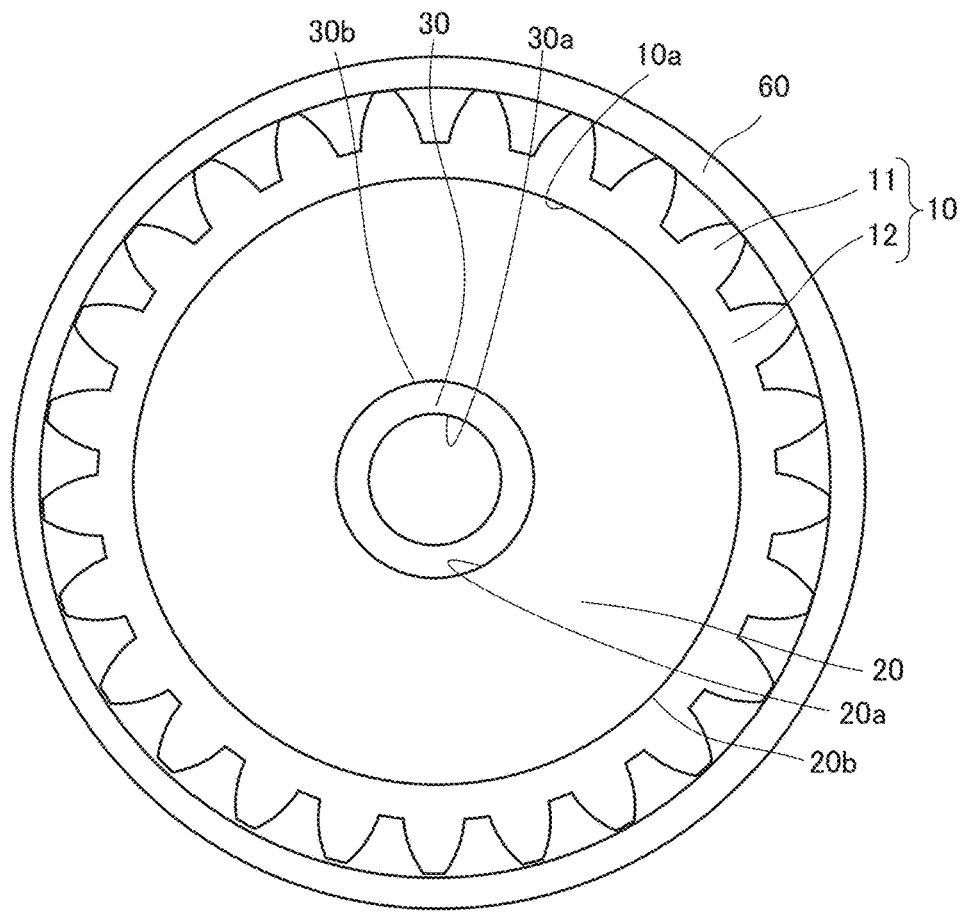
FIG. 6B is a front view of the gear after the support portion molding step.

Next, as shown in FIGS. 6A and 6B, the molten fiber reinforced resin is filled between the gear portion 10 and the core portion 30, and the support portion 20 is molded. In the support portion molding step, the core portion 30 and the support portion 20 are fixed to each other, and the support portion 20 and the gear portion 10 are fixed to each other via the annular groove 51*b* and the holes 52*b* of the support portion 20 and the annular protrusion portion 51*a* and the rod-shaped protrusions 52*a* of the gear portion 10. A resin portion 71 is formed corresponding to a gate of the mold. The gear portion 10 is made of resin, and thus when the molten fiber reinforced resin is filled between the gear portion 10 and the core portion 30, the gear portion 10 expands in the radial direction due to heat and pressure of the fiber reinforced resin as shown in FIGS. 6A and 6B. The radial expansion of the gear portion 10 is restricted by the mold 60. That is, the gear portion 10 expands until the gear portion 10 comes into contact with the inner peripheral surface of the mold 60, and expands by the length A in the radial direction in the support portion molding step.

<Support Portion Cooling Step>

Figure 7A:
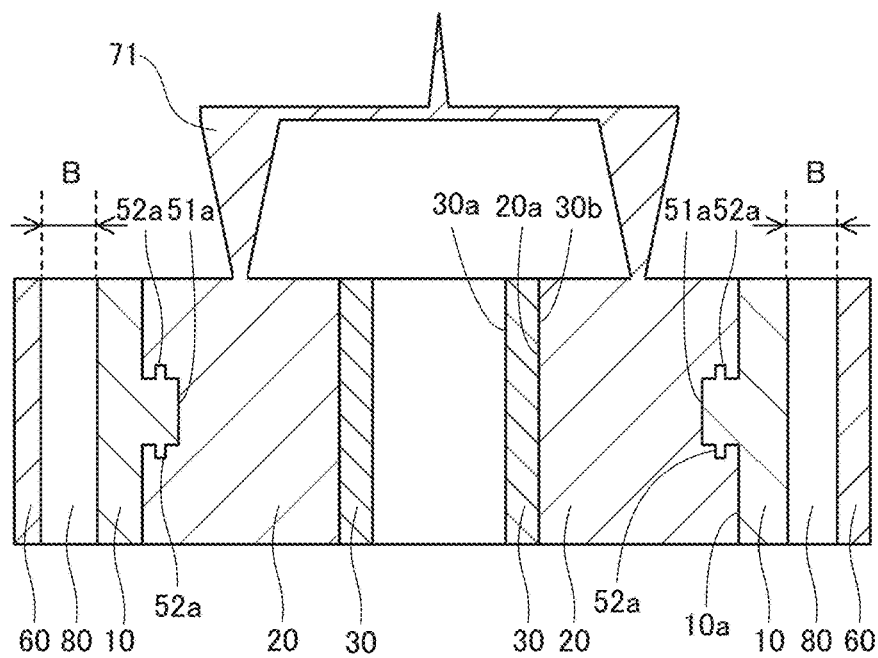
FIG. 7A is a cross-sectional view of the gear after a support portion cooling step.
Figure 7B:
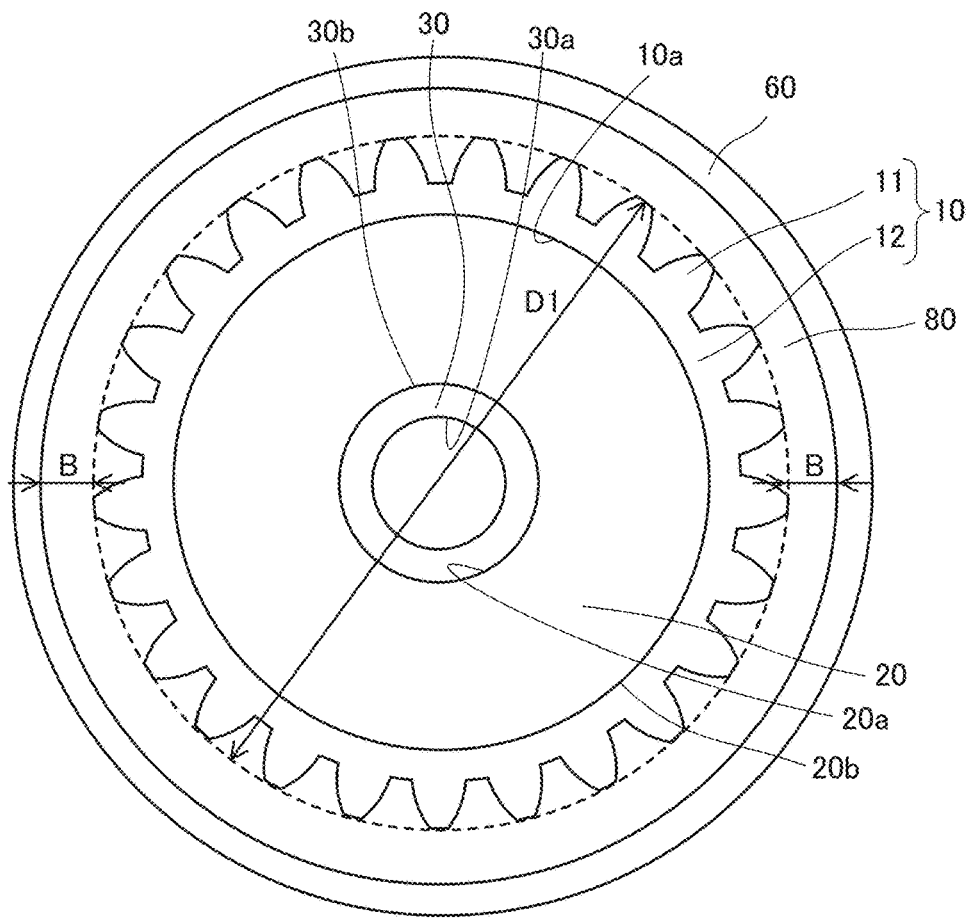
FIG. 7B is a front view of the gear after the support portion cooling step.

Next, the support portion 20 molded in the support portion molding step is cooled and solidified. As shown in FIGS. 7A and 7B, in the support portion cooling step, the support portion 20 shrinks by a length B in the radial direction due to heat shrinkage. Accordingly, the gear portion 10 also shrinks by the length B with the heat shrinkage of the support portion 20.

After the support portion cooling step, the gear portion 10, the support portion 20, and the core portion 30 are removed from the mold 60, and the resin portion 71 that is unnecessary for a configuration of the gear 100 is removed. Accordingly, the gear 100 shown in FIG. 2 is completed.

In this way, the gear portion 10 of the gear 100 expands in the support portion molding step, and shrinks in the support portion cooling step. Therefore, the outer diameter of the gear portion 10 changes between before molding and after cooling of the support portion 20, and a residual stress is generated in the gear portion. The residual stress may affect durability of the gear portion 10.

Figure 8A:
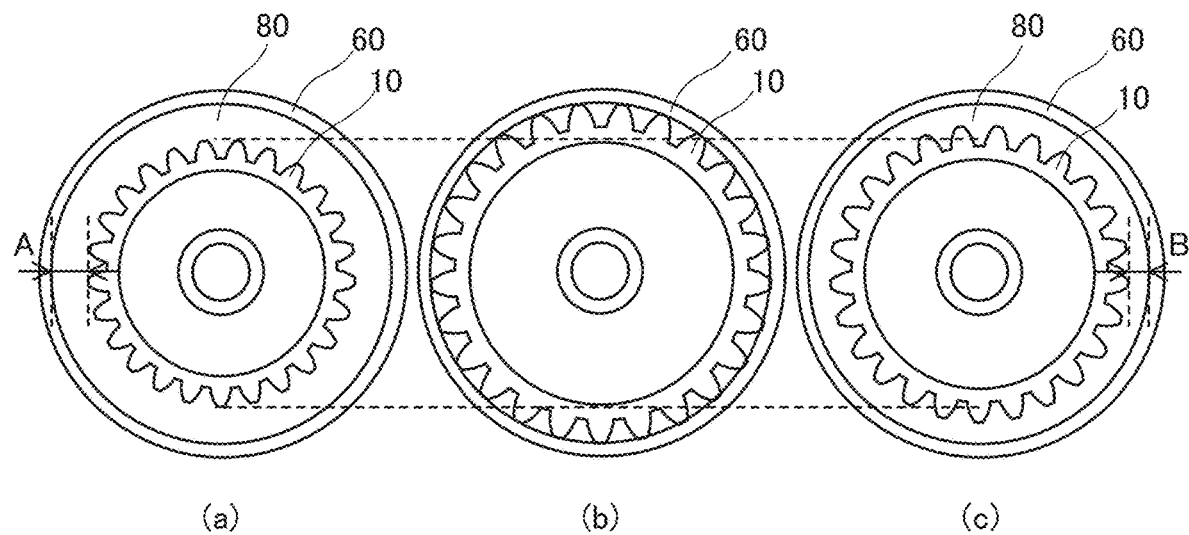
FIG. 8A is a view showing a manufacturing step of the gear according to a comparative example of the embodiment of the present invention.
Figure 8B:
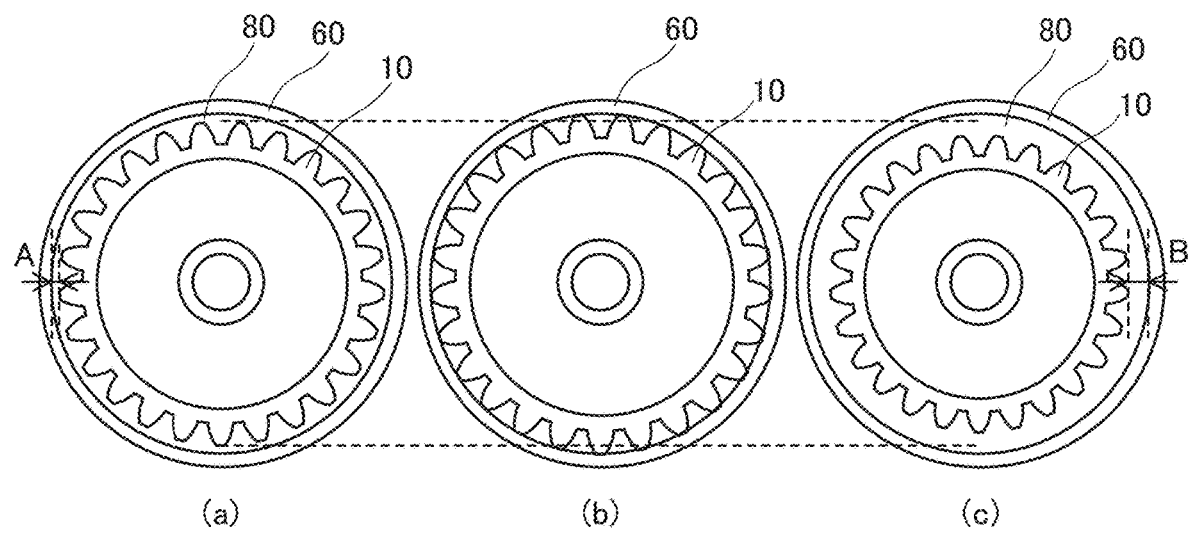
FIG. 8B is a view showing a manufacturing step of the gear according to the embodiment of the present invention.

Here, the residual stress generated in the gear portion 10 will be described with reference to FIGS. 8A and 8B. FIG. 8A is a view showing a manufacturing step of the gear 100 when the radial length A of the gap 80 is larger than the radial shrinkage amount B of the support portion 20 in the support portion cooling step. FIG. 8B is a view showing a manufacturing step of the gear 100 of the present embodiment in which the radial length A of the gap 80 is smaller than the radial shrinkage amount B of the support portion 20 in the support portion cooling step. In FIGS. 8A and 8B, (a) shows a state before the support portion molding step, (b) shows a state after the support portion molding step, and (c) shows a state after the support portion cooling step. In FIGS. 8A and 8B, the radial length of the gap 80, and the expansion and the shrinkage amount of the gear portion 10 are shown at an exaggerated size.

As shown in FIG. 8A, when the radial length A of the gap 80 is larger than the radial shrinkage amount B of the support portion 20 in the support portion cooling step, a radial expansion amount A of the gear portion 10 in the support portion molding step is larger than the radial shrinkage amount B of the gear portion 10 in the support portion cooling step. Therefore, an outer diameter of the gear portion after the support portion cooling step is larger than an outer diameter of the gear portion before the support portion molding step. Accordingly, a tensile residual stress is generated in the gear portion 10.

In contrast, as in the present embodiment shown in FIG. 8B, when the radial length A of the gap 80 is smaller than the radial shrinkage amount B of the support portion 20 in the support portion cooling step, the radial expansion amount A of the gear portion 10 in the support portion molding step is smaller than the radial shrinkage amount B of the gear portion 10 in the support portion cooling step. Therefore, an outer diameter of the gear portion after the support portion cooling step is smaller than an outer diameter of the gear portion before the support portion molding step. Accordingly, a compressive residual stress is generated in the gear portion 10.

Figure 9:
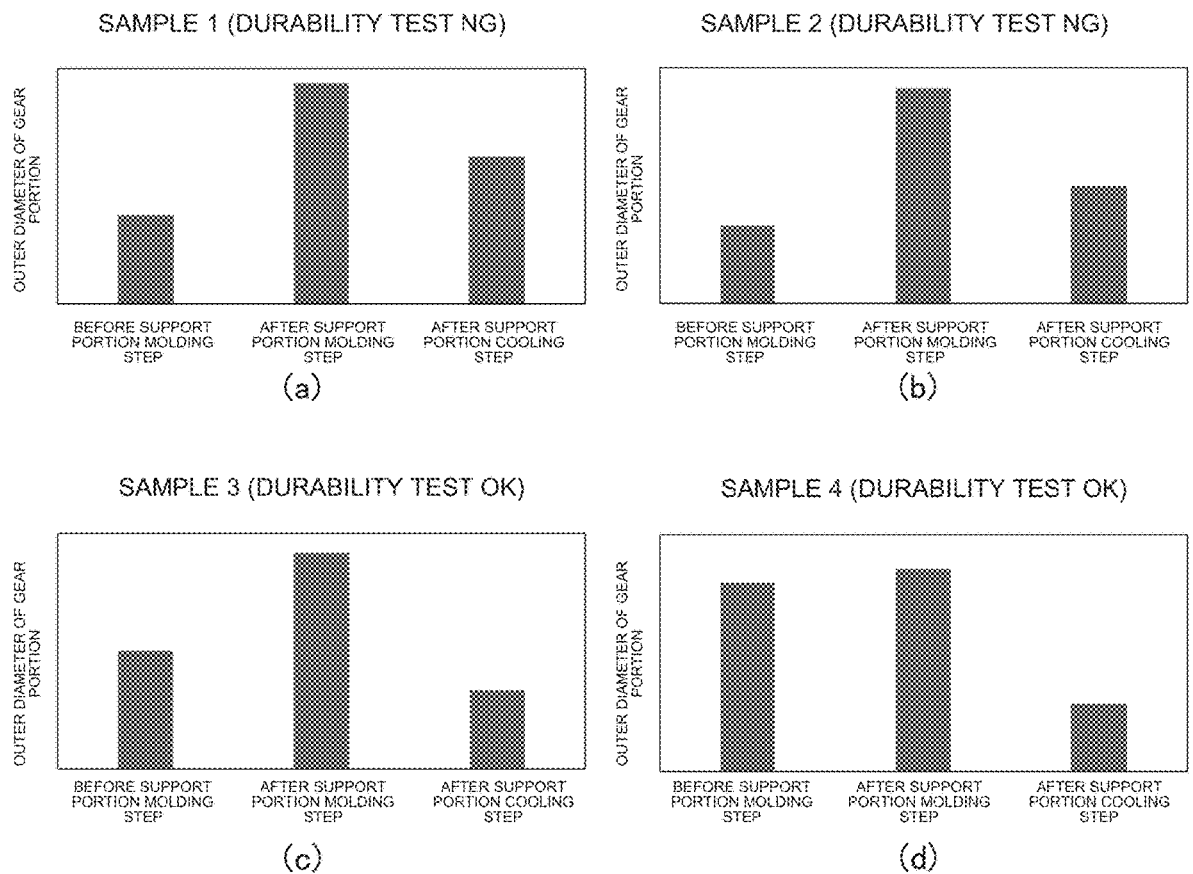
FIG. 9 is a graph showing outer diameters of each gear portion in the manufacturing step in samples in which an abnormality occurs in the gear portion and samples in which no abnormality occurs in a durability test of the gear.

Here, FIG. 9 shows outer diameters of each gear portion 10 before the support portion molding step, after the support portion molding step, and after the support portion cooling step, in samples (Sample 1 and 2) of durability test NG in which an abnormality occurs in the gear portion 10 and samples (Sample 3 and 4) of durability test OK in which no abnormality occurs in the gear portion 10 in a durability test of the gear 100. In the samples of the durability test NG, the outer diameter of the gear portion 10 after the support portion cooling step is larger than the outer diameter of the gear portion 10 before the support portion molding step. That is, in the samples of the durability test NG, a tensile residual stress was generated in the gear portion 10. In contrast, in the samples of the durability test OK, the outer diameter of the gear portion 10 after the support portion cooling step is smaller than the outer diameter of the gear portion 10 before the support portion molding step. That is, in the samples of the durability test OK, a compressive residual stress was generated in the gear portion 10. In this way, it was actually confirmed that the durability of the gear portion 10 of the gear 100 is high in the samples in which the compressive residual stress is generated in the gear portion 10.

As described above, in the present embodiment, by setting the radial length A of the gap 80 to be smaller than the radial shrinkage amount B of the support portion 20 specified in advance, the compressive residual stress is generated in the gear portion 10 instead of the tensile residual stress. Accordingly, an influence on the durability of the gear portion 10 of the gear 100 can be reduced. The inner diameter of the mold 60 is set based on the radial shrinkage amount B of the support portion 20 and the design value D1 of the outer diameter of the gear portion 10, and the outer diameter D2 of the gear portion 10 before the support portion molding step is set based on the inner diameter of the mold 60 and the radial shrinkage amount B of the support portion 20. Accordingly, the gear 100 having the outer diameter of the design value can be manufactured while reducing the influence on the durability of the gear portion 10.

A method of setting the inner diameter of the mold 60 and the outer diameter of the gear portion 10 before the support portion molding step is not limited to the above. At least, the radial length A of the gap 80 before the support portion molding step needs to be set to be smaller than the radial shrinkage amount B of the support portion 20. Accordingly, the compressive residual stress is generated in the gear portion 10 instead of the tensile residual stress, and the influence on the durability of the gear portion 10 of the gear 100 can be reduced.

According to the above-described embodiment, the following functions and effects are exerted.

The radial expansion of the gear portion 10 in the support portion molding step is restricted by the mold 60, so that the radial expansion amount of the gear portion 10 in the support portion molding step is smaller than the radial shrinkage amount B of the gear portion in the support portion cooling step. Therefore, the outer diameter of the gear portion 10 after the support portion cooling step is smaller than the outer diameter of the gear portion 10 before the support portion molding step, and thus the compressive residual stress is generated in the gear portion instead of the tensile residual stress. Therefore, the influence on the durability of the gear portion 10 of the gear 100 can be reduced.

The gear 100 having the outer diameter of the design value can be manufactured by specifying the radial shrinkage amount B of the support portion 20 in the support portion cooling step.

Hereinafter, a configuration, functions, and effects of the embodiment of the present invention will be collectively described.

A method for manufacturing the gear 100, the gear 100 including the annular gear portion 10 having the wheel teeth 11 on the outer periphery, the annular support portion 20 provided on the inner peripheral surface 10a of the gear portion 10 and supporting the gear portion 10, and the core portion 30 provided inside the support portion 20, the method including: the support portion molding step of molding the support portion 20 by disposing the gear portion 10 and the core portion 30 in the annular mold 60 and filling the fiber reinforced resin between the gear portion 10 and the core portion 30; and the support portion cooling step of cooling the support portion 20 molded in the support portion molding step, in which the radial gap A between the wheel teeth 11 of the gear portion 10 and the mold 60 before the support portion molding step is set to be smaller than the radial shrinkage amount B of the support portion 20 in the support portion cooling step.

In this configuration, the radial expansion of the gear portion 10 in the support portion molding step is restricted by the mold 60, so that the radial expansion amount of the gear portion 10 in the support portion molding step is smaller than the radial shrinkage amount B of the gear portion in the support portion cooling step. Therefore, the outer diameter of the gear portion 10 after the support portion cooling step is smaller than the outer diameter of the gear portion 10 before the support portion molding step. Therefore, the compressive residual stress is generated in the gear portion instead of the tensile residual stress. Therefore, it is possible to provide a gear manufacturing method that reduces the influence on the durability of the gear portion of the gear.

The inner diameter of the mold 60 is set based on the radial shrinkage amount B of the support portion 20 in the support portion cooling step and the design value D1 of the outer diameter of the gear portion 10.

The outer diameter D2 of the gear portion 10 before the support portion molding step is set based on the inner diameter of the mold 60 and the radial shrinkage amount B of the support portion 20 in the support portion cooling step specified in advance.

In this configuration, the gear 100 having the outer diameter of the design value can be manufactured by specifying the radial shrinkage amount B of the support portion 20 in the support portion cooling step.

The gear 100 including the annular gear portion 10 having the wheel teeth 11 on the outer periphery, the annular support portion 20 provided on the inner peripheral surface 10a of the gear portion 10 and supporting the gear portion 10, and the core portion 30 provided inside the support portion 20, in which the radial gap A between the wheel teeth 11 of the gear portion 10 and the annular mold 60 before the support portion molding step of molding the support portion 20 by disposing the gear portion 10 and the core portion 30 in the mold 60 and filling the fiber reinforced resin between the gear portion 10 and the core portion 30 is set to be smaller than the radial shrinkage amount B of the support portion 20 in the support portion cooling step of cooling the support portion 20 molded in the support portion molding step.

In this configuration, the compressive residual stress is generated in the gear portion 10 instead of the tensile residual stress. Therefore, the influence on the durability of the gear portion 10 of the gear 100 is reduced.

Embodiments of the present invention were described above, but the above embodiments are merely examples of applications of the present invention, and the technical scope of the present invention is not limited to the specific constitutions of the above embodiments.

In the above-described embodiment, as the gear 100, the worm wheel that meshes with the worm shaft 6 has been described, but the gear 100 is not limited to the worm wheel.

In the above-described embodiment, the support portion 20 is formed of the fiber reinforced resin, but is not limited to the fiber reinforced resin.

For example, a resin layer having a composition different from that of the support portion 20 may be interposed between the support portion 20 and the core portion 30.

With respect to the above description, the contents of application No. 2020-4286, with a filing date of Jan. 15, 2020 in Japan, are incorporated herein by reference.

The invention claimed is:

1. A gear manufacturing method, the gear including an annular gear portion having teeth on an outer periphery, an annular support portion provided on an inner peripheral surface of the gear portion and supporting the gear portion, and a core portion provided inside the support portion, the method comprising:
   a support portion molding step of molding the support portion by disposing the gear portion and the core portion in an annular mold and filling a resin between the gear portion and the core portion; and
   a support portion cooling step of cooling the support portion molded in the support portion molding step, wherein
   a radial gap between the teeth of the gear portion and the mold before the support portion molding step is set to be smaller than a radial shrinkage amount of the support portion in the support portion cooling step.

2. The gear manufacturing method according to claim 1, wherein
   an inner diameter of the mold is set based on the radial shrinkage amount of the support portion in the support portion cooling step and a design value of an outer diameter of the gear portion.

3. The gear manufacturing method according to claim 1, wherein
   an outer diameter of the gear portion before the support portion molding step is set based on an inner diameter of the mold and the radial shrinkage amount of the support portion in the support portion cooling step.

* * * * *